United States Patent
Fujita

(10) Patent No.: US 9,691,004 B2
(45) Date of Patent: Jun. 27, 2017

(54) DEVICE AND METHOD FOR SERVICE PROVISION ACCORDING TO PREPARED REFERENCE IMAGES TO DETECT TARGET OBJECT

(71) Applicant: FUJITSU LIMITED, Kawasaki-shi, Kanagawa (JP)

(72) Inventor: Sokichi Fujita, Chiyoda (JP)

(73) Assignee: FUJITSU LIMITED, Kawasaki (JP)

( * ) Notice: Subject to any disclaimer, the term of this patent is extended or adjusted under 35 U.S.C. 154(b) by 41 days.

(21) Appl. No.: 14/750,341

(22) Filed: Jun. 25, 2015

(65) Prior Publication Data

US 2016/0005175 A1 Jan. 7, 2016

(30) Foreign Application Priority Data

Jul. 2, 2014 (JP) .................. 2014-136745

(51) Int. Cl.
G06K 9/00 (2006.01)
G06K 9/62 (2006.01)
G06Q 30/02 (2012.01)
G06K 9/68 (2006.01)
G06Q 50/00 (2012.01)

(52) U.S. Cl.
CPC ........... *G06K 9/6202* (2013.01); *G06K 9/685* (2013.01); *G06Q 30/02* (2013.01); *G06Q 50/01* (2013.01); *G06K 9/6215* (2013.01); *G06K 2209/17* (2013.01)

(58) Field of Classification Search
None
See application file for complete search history.

(56) References Cited

U.S. PATENT DOCUMENTS

| | | | |
|---|---|---|---|
| 8,369,570 B2* | 2/2013 | Myers | G06K 9/00221 382/103 |
| 9,129,027 B1* | 9/2015 | Hamedi | G06F 17/30867 |
| 2011/0213681 A1* | 9/2011 | Shahid | G06Q 30/02 705/27.1 |

(Continued)

FOREIGN PATENT DOCUMENTS

| | | |
|---|---|---|
| JP | 11-136573 | 5/1999 |
| JP | 2005-45843 | 2/2005 |

(Continued)

OTHER PUBLICATIONS

Patent Abstracts of Japan, Publication No. 2005-45843, published Feb. 17, 2005.

(Continued)

*Primary Examiner* — Tahmina Ansari
(74) *Attorney, Agent, or Firm* — Staas & Halsey LLP

(57) ABSTRACT

A non-transitory recording medium storing a program that causes a computer to execute a process, the process includes: imaging a given object from plural different angles, and extracting from the plural obtained captured images, one or plural captured images having a feature amount that differs from a feature amount in another captured image by more than a specific reference amount; and providing the one or the plural extracted captured images as determination-use images employable in determination as to whether or not the given object is included in a captured image.

12 Claims, 14 Drawing Sheets

(56) References Cited

U.S. PATENT DOCUMENTS

| | | | |
|---|---|---|---|
| 2013/0060875 A1* | 3/2013 | Burnett | H04N 21/4788 |
| | | | 709/206 |
| 2013/0081082 A1* | 3/2013 | Riveiro Insua | H04N 21/8549 |
| | | | 725/38 |
| 2013/0226711 A1* | 8/2013 | Wu | G06Q 30/02 |
| | | | 705/14.69 |
| 2014/0129326 A1* | 5/2014 | Munitz | G06Q 30/02 |
| | | | 705/14.48 |
| 2015/0294358 A1* | 10/2015 | Galadari | G06Q 50/01 |
| | | | 705/14.55 |
| 2016/0005175 A1* | 1/2016 | Fujita | G06K 9/6202 |
| | | | 382/103 |
| 2016/0012498 A1* | 1/2016 | Prasad | G06Q 30/0601 |
| | | | 705/26.1 |

FOREIGN PATENT DOCUMENTS

| | | |
|---|---|---|
| JP | 2007-149095 | 6/2007 |
| JP | 2008-52598 | 3/2008 |

OTHER PUBLICATIONS

Patent Abstracts of Japan, Publication No. 2007-149095, published Jun. 14, 2007.
Patent Abstracts of Japan, Publication No. 11-136573, published May 21, 1999.
Patent Abstracts of Japan, Publication No. 2008-52598, published Mar. 6, 2008.

* cited by examiner

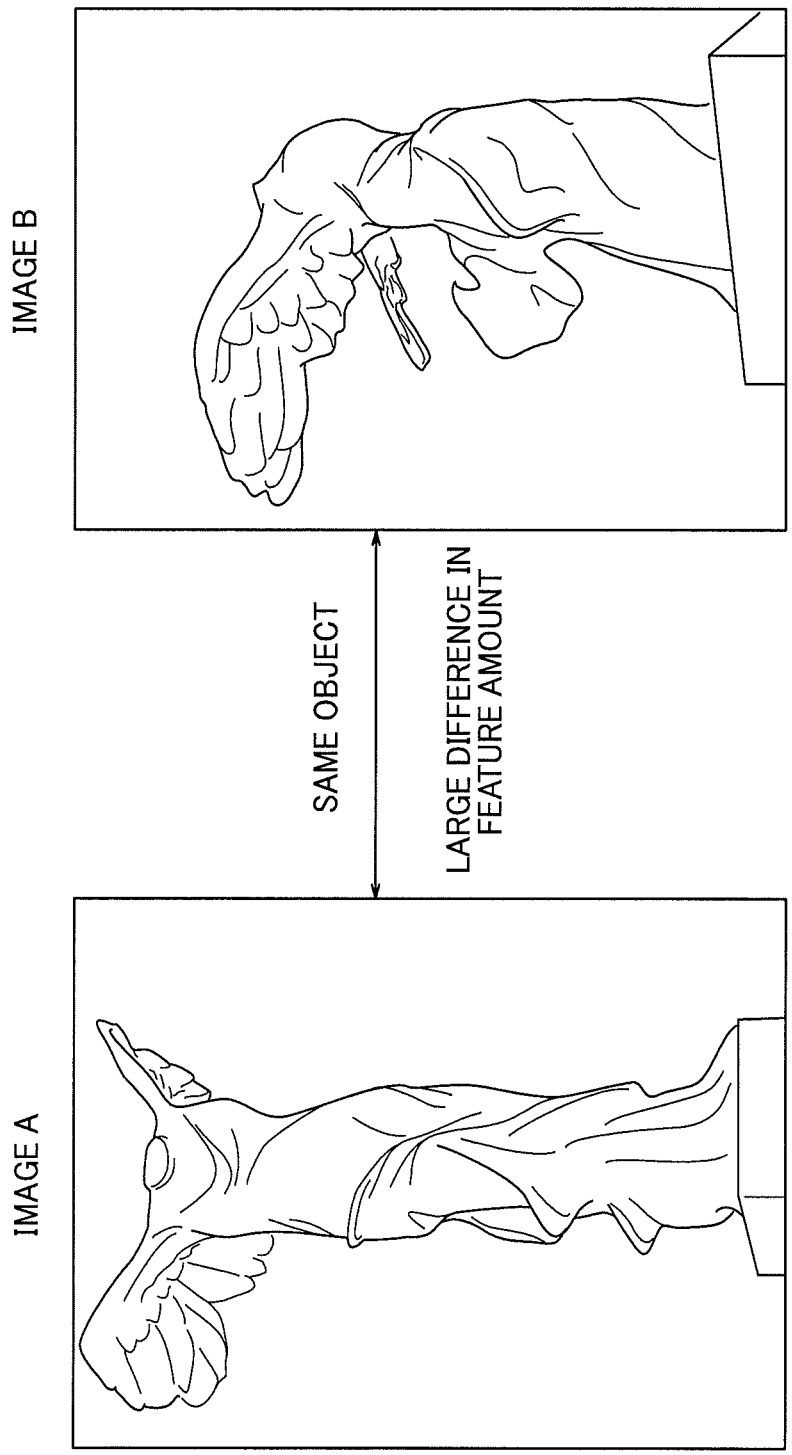

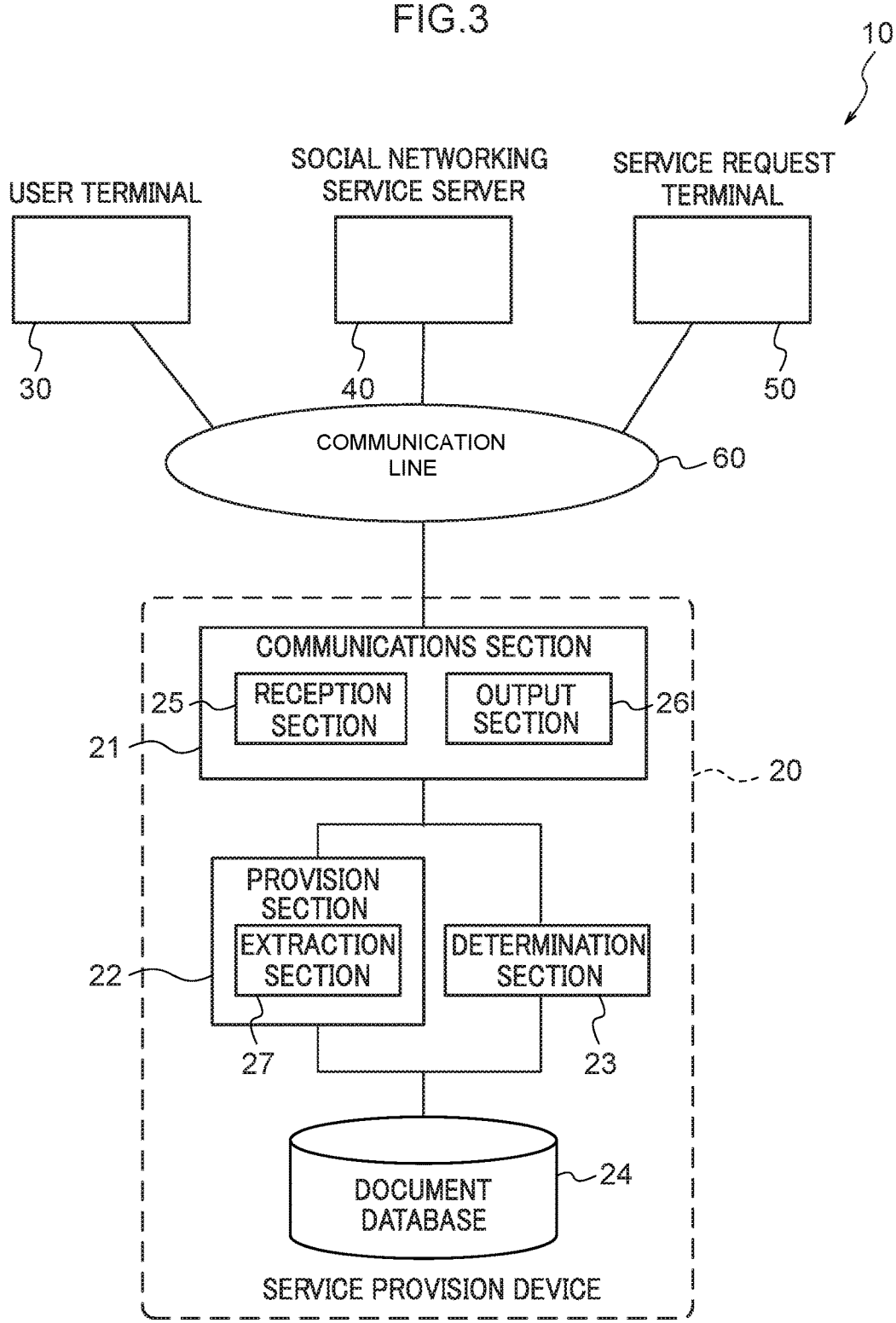

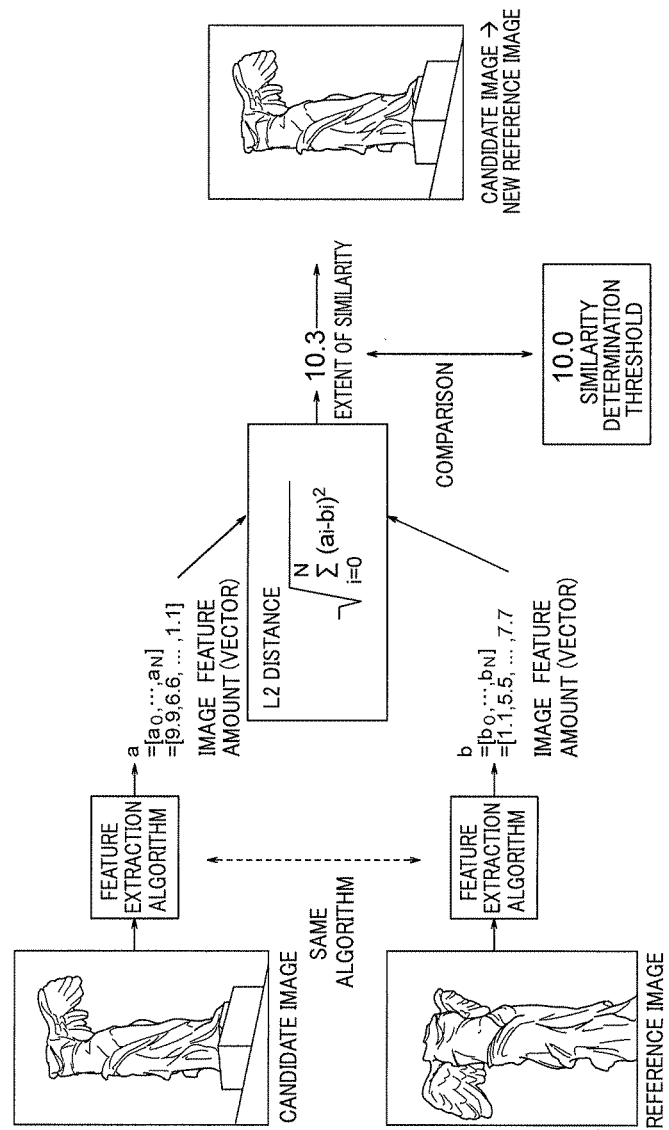

FIG.5

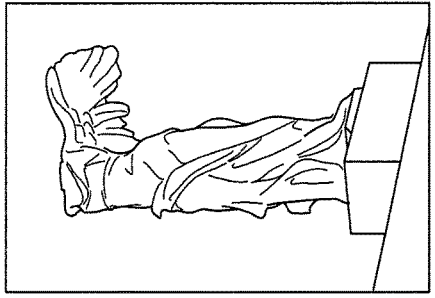

DETERMINATION-USE IMAGE A

```
// DOCUMENT DATABASE STRUCTURE
{
  _id:'op123455555', // DB PRIMARY KEY
  created: 20150710115500, // TIME OF STORAGE IN DB
  user:
  {
    id:'eu10249810', // USER ID
    name:'Sokichi Fujita' // USER NAME
  },
  tag: // INFORMATION (TAG) OF IMAGED OBJECT
  {
    id:'ns22334455', // OBJECT ID
    name: 'nike_samothrace_A' // OBJECT TITLE
  },
  feature: [9.9,6.6,3.3,.,1.1], // FEATURE VECTORS USED IN EXTENT OF SIMILARITY
  CALCULATION
  extractor: // ALGORITHM USED IN FEATURE EXTRACTION
  {
    id: 'ex001', // ID OF ALGORITHM USED INFEATURE EXTRACTION
    name: 'BRISK', // NAME OF ALGORITHM USED IN FEATURE EXTRACTION
  },
  matcher:: // ALGORITHM USED IN REFERENCE IMAGE DETERMINATION
  {
    id: 'mt001', // ID OF ALGORITHM USED IN REFERENCE IMAGE DETERMINATION
    name: 'I2', // NAME OF ALGORITHM USED IN REFERENCE IMAGE
    DETERMINATION
    threshold: 10 // THRESHOLD VALUE OF REFERENCE IMAGE DETERMINATION
  },
  effects: [ 'ef0001' ], // LIST OF APPLIED EFFECTS.
  url: [ 'https://example.com/.../1234.jpg' ] // IMAGE STORAGE LOCATION
  :
},
```

FIG.6

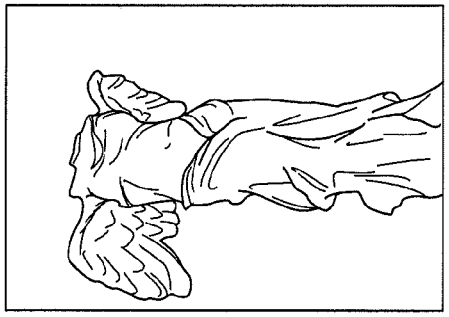

DETERMINATION-USE IMAGE B

```
// DOCUMENT DATABASE STRUCTURE
{
  id:'cp123456789', // DB PRIMARY KEY
  created: 20150710115545, // TIME OF STORAGE IN DB
  user:
  {
    id:'eu10249810', // USER ID
    name:'Sokichi Fujita' // USER NAME
  },
  tag: // INFORMATION (TAG) OF IMAGED OBJECT
  {
    id:'ns223344455', // OBJECT ID
    name: 'nike_samothrace_A' // OBJECT TITLE
  },
  feature: [1.1, 5.5, 10.1, ..., 7.7], // FEATURE VECTORS USED IN EXTENT OF SIMILARITY CALCULATION
  extractor: // ALGORITHM USED IN FEATURE EXTRACTION
  {
    id: 'ex001', // ID OF ALGORITHM USED IN FEATURE EXTRACTION
    name: 'BRISK', // NAME OF ALGORITHM USED IN FEATURE EXTRACTION
  },
  matcher: // ALGORITHM USED IN REFERENCE IMAGE DETERMINATION
  {
    id: 'mt001', // ID OF ALGORITHM USED IN REFERENCE IMAGE DETERMINATION
    name: 'l2', // NAME OF ALGORITHM USED IN REFERENCE IMAGE DETERMINATION
    threshold: 10 // THRESHOLD VALUE OF REFERENCE IMAGE DETERMINATION
  },
  effects: ['ef0001'], // LIST OF APPLIED EFFECTS.
  url: ['https://example.com/.../1235.jpg'] // IMAGE STORAGE LOCATION
}
```

FIG.13

CLASS A — DETERMINATION-USE IMAGE OF CLASS A

CLASS B — DETERMINATION-USE IMAGE OF CLASS B

CLASS C — DETERMINATION-USE IMAGE OF CLASS C

CLASS D — DETERMINATION-USE IMAGE OF CLASS D

FEATURE AMOUNTS OF IMAGES BETWEEN DIFFERENT CLASSES DIFFER BY MORE THAN SIMILARITY DETERMINATION THRESHOLD VALUE

DEVICE AND METHOD FOR SERVICE PROVISION ACCORDING TO PREPARED REFERENCE IMAGES TO DETECT TARGET OBJECT

CROSS-REFERENCE TO RELATED APPLICATION

This application is based upon and claims the benefit of priority of the prior Japanese Patent Application No. 2014-136745, filed on Jul. 2, 2014, the entire contents of which are incorporated herein by reference.

FIELD

The embodiments discussed herein are related to a service provision device, and method.

BACKGROUND

Recently, development is progressing in methods for determining whether or not a specific subject is included in an image captured by cameras and the like. Such image determinations generally employ a method that executes matching between a captured image and an image of the subject serving as a reference for determination (determination-use image), and determines whether or not the subject is included in the captured image.

Commonly, the size and display angle of the subject included in the captured image is often different from the size and display angle in the determination-use image.

A method has therefore been proposed in which a portion of the captured image is set as a matching region, and determination is made as to whether or not a specific subject is included in a captured image by resizing and rotating the set matching region.

RELATED PATENT DOCUMENTS

Japanese Patent Application Laid-Open (JP-A) No. 2008-52598

SUMMARY

According to an aspect of the embodiments, a non-transitory recording medium stores a program that causes a computer to execute process. The process includes: extracting, from out of plural captured images obtained by imaging a given object from plural different angles, one or plural captured images having a feature amount that differs by more than a specific reference amount from feature amounts of the other captured images; and providing the extracted one or plural captured images as determination-use image(s) employable in determination as to whether or not the given object is included in a captured image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram for explaining differences in the appearance of an object due to differences in imaging angle.

FIG. 3 is a diagram illustrating an example of a service provision device.

FIG. 4 is a diagram illustrating an example of extraction processing of a reference image.

FIG. 5 is a diagram illustrating an example of a database structure for a determination-use image.

FIG. 6 is a diagram illustrating an example of a database structure for a determination-use image.

FIG. 13 is a diagram illustrating an example of an execution result of determination-use image generation processing of a service provision system according to the second exemplary embodiment.

DESCRIPTION OF EMBODIMENTS

Detailed explanation follows regarding an example of an exemplary embodiment according to technology disclosed herein with reference to the drawings.

Recently, social networking services (SNS) that share information between somewhat interlinked communities are being extensively used as a community instrument for individuals and corporations. In SNS, information is spread within a community using text, images, audio, etc., and this is becoming recognized as an important advertising medium for corporate enterprises. At the same time, opportunities are increasing to implement campaigns using SNS and aimed at promoting sales of products.

In the present exemplary embodiment, an example of a system is explained that determines whether or not a product sold by a given manufacturer is included in an image when, for example, a user posts an image captured of the product to the SNS, and then provides a gift or the like to the user that posted the image taken of the product. Although the type of product made the subject of a campaign is not limited, explanation follows of an example in which a product A that is a canned drink sold by a drinks manufacturer serves as the product subject to a campaign.

Figure 1:
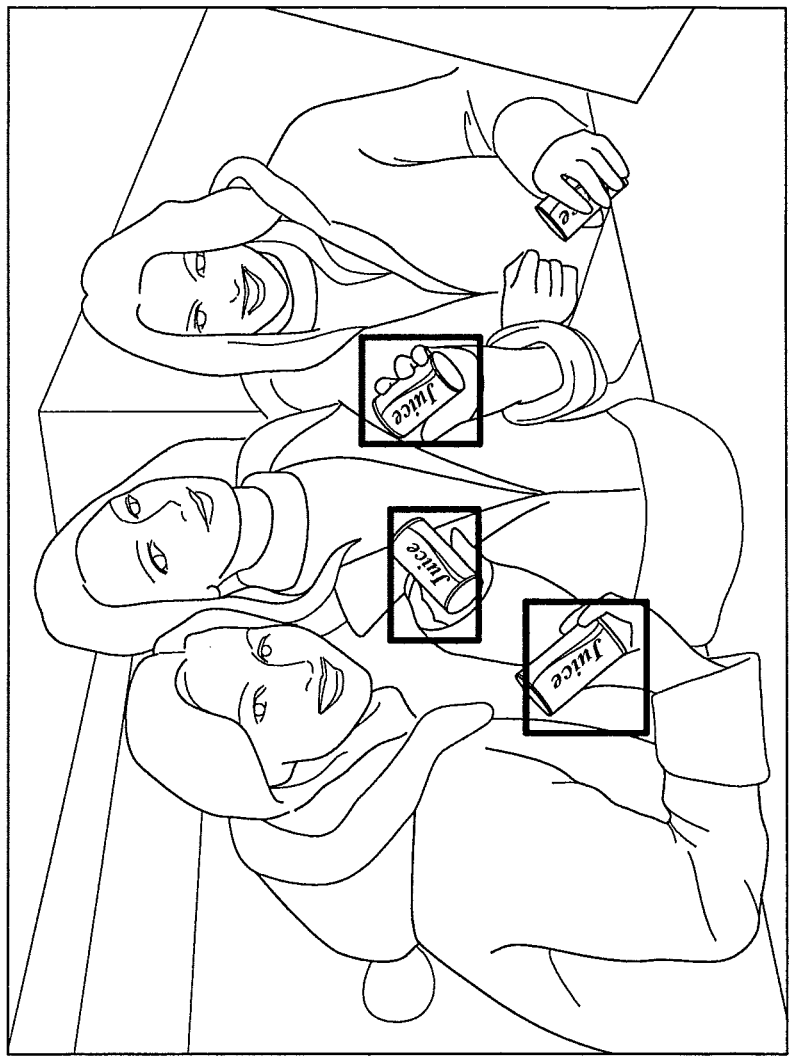
FIG. 1 is a diagram illustrating an example of a captured image.

In implementing such a campaign, determination needs to be made as to whether or not the product A is included in a captured image posted to an SNS by a user, such as that illustrated in FIG. 1. As is apparent from FIG. 1, the product A is sometimes captured from various angles, and there are many problems in determining whether or not the product A is included in the captured image if the imaging angle is different, despite the product A being the same.

Although the product A is surrounded by a rectangle to make the position of the product A in the captured image clear in the example of FIG. 1, there is no rectangle surrounding the product A in the captured image posted to the SNS by the user.

FIG. 2 is a diagram using a sculpture to explain differences in appearance when the same object is imaged from different angles in an easily understood manner. Image A is an image captured from the front of the sculpture, and image B is an image captured from the side of the same sculpture. In this manner, when the imaging angle is different, despite this being the same sculpture, the hues change due to the light illuminating the sculpture being brighter or duller, and the outline shape, position, etc. of the sculpture also differ. Therefore feature amounts extracted from each image using known feature extraction algorithms will also differ. It is therefore conceivable that the product A depicted in the captured image will be mis-determined as not being product A when the image capture conditions for product A differ.

A permissible range of difference in feature amounts for determination of the product A is therefore set high, such that the product A is determined even if feature amounts of a determination-use image pre-prepared to serve as a reference for determining whether or not an object depicted in the captured image is the product A differ greatly from feature amounts of the product A depicted in the captured image. However, when such setting is performed, a reverse case is now conceivable in which a product different from the product A is mis-determined as the product A, making it difficult to call this an effective method of reducing mis-determinations.

A method is conceivable in which plural determination-use images captured at various imaging angles are pre-prepared, and the feature amounts of each of the determination-use images are compared to the feature amounts of the product A depicted in a captured image to prevent the misrecognitions described above.

However, in this case calculation needs to be made of image similarities between a single captured image and each of plural determination-use images, causing an issue in that the calculation volume increases as the number of determination-use images increases. It is therefore understood that performing determination of image similarity using as few determination-use images as possible is preferable, though it remains unclear how many determination-use images are preferably prepared, and from what angles they are preferably imaged.

Hence each of the following exemplary embodiments explain a system that creates determination-use images for determining whether a subject is included in a captured image by using a smaller number of determination-use images.

First Exemplary Embodiment

FIG. 3 is a diagram illustrating an example of a service provision system 10 according to an exemplary embodiment.

The service provision system 10 is a system in which a service provision device 20, a user terminal 30, a social networking service server 40 (referred to as SNS server 40 hereafter), and a service request terminal 50 are connected to one another through a communication line 60. Note that although the communication line 60 according to the present exemplary embodiment is an internet line in the following explanation, the type of the communication line 60 is not limited thereto. For example, the communication line 60 may be a dedicated line, or may be an intranet such as a company-wide LAN. The architecture of the communication line 60 may be formed using any out of wires, wireless, or a mixture of wires and wireless.

The user terminal 30 is a terminal that posts captured images of the product A taken by the user to an SNS. The user terminal 30 is, for example, a personal computer (PC), a notebook PC, a tablet terminal, or a smartphone, and may be any information device that includes a function for sending captured image data to the SNS server 40 through the communication line 60.

The SNS server 40 is a server that stores captured images sent from the user terminal 30, and manages the publication destination and the like of the captured image based on a security policy set by the user who sent the captured image.

The service request terminal 50 is, for example, installed at the drinks manufacturer implementing the campaign for the product A, and exchanges information needed for the campaign for the product A with the service provision device 20 described below. A browser pre-installed to the service request terminal 50 may be employed for data exchange with the service provision device 20, or a dedicated application provided by the administrator managing the service provision device 20 may be employed. The installation location of the service request terminal 50 is not limited to within the corporate entity implementing the campaign, and it goes without saying that the service request terminal 50 may be installed at any location depending on the situation.

The user terminal 30, the SNS server 40, and the service request terminal 50 may each have plural connections to the communication line 60.

The service provision device 20 includes a communications section 21, a provision section 22, a determination section 23, and a document database 24. The document database 24 is referred to as database 24 hereafter.

The communications section 21 connects the service provision device 20 to the communication line 60, and exchanges the needed data with information devices such as the user terminal 30, the SNS server 40, and the service request terminal 50.

Specifically, the communications section 21 includes a reception section 25 and an output section 26. The reception section 25 receives image data and the like from the user terminal 30, the SNS server 40, and the service request terminal 50. The output section 26 outputs data included in the service provision device 20 to the user terminal 30, the SNS server 40, and the service request terminal 50 if necessary.

For example, the drinks manufacturer transmits images (registered images), captured while moving at least 360° around the product A, from the service request terminal 50 to the reception section 25 of the service provision device 20 over the communication line 60 as the references for the campaign for the product A. The reception section 25 receives the registered images capturing the product A from plural different angles. The registered images transmitted from the service request terminal 50 to the service provision device 20 may be either still images or video. The registered images in the present exemplary embodiment are video as an example. The registered images include plural captured images allocated frame numbers from FRAME 1 to FRAME M (where M is a natural number) in capture time sequence, and the video is configured from a collection of the captured images corresponding to each of the frames.

The provision section 22 includes an extraction section 27. The extraction section 27 extracts captured images from the registered images received by the reception section 25 for use in determination as to whether or not the product A is included in the captured image posted to the SNS server 40 by the user.

First, specific explanation follows regarding extraction of the images by the extraction section 27. FIG. 4 is a diagram illustrating an example of captured image extraction processing in the extraction section 27.

First, the extraction section 27 sets as a reference image a captured image of a freely selected frame included in registered images received from the reception section 25. The extraction section 27 then designates captured images of frames that are different from the reference image as candidate images for the reference images, and extracts feature amounts from the reference image and each of the candidate images using a known matching feature extraction algorithm.

Binary Robust Invariant Scalable Keypoints (BRISK) is employed as an example of a feature extraction algorithm in the extraction section 27 according to the present exemplary embodiment; however, the feature extraction algorithm employed by the extraction section 27 is not limited thereto. For example, a feature extraction algorithm that excels in extracting features from rotated images or the like may be employed according to the image capture conditions of the product that is the campaign subject, such as conditions in which the product is often captured in a tilted state and is often captured outdoors.

Note that BRISK is a feature extraction algorithm in which scale invariability and rotation invariability are introduced to Binary Robust Independent Elementary Features (BRIEF), which are focused on differences in luminance between two separated points of an image. BRISK extracts feature amounts from images having modified scale and rotation with higher precision than Scale Invariant Feature Transform (SIFT) or Speeded Up Robust Feature (SURF) that are typical feature extraction algorithms for extracting from images feature amounts that are invariant on scaling and rotation.

A feature amount a of a candidate image extracted using a feature extraction algorithm is expressed as a vector quantity $\hat{a}=[a_0, \ldots, a_N]$, and a feature amount b of a reference image is expressed as a vector quantity $\hat{b}=[b_0, \ldots, b_N]$. Herein, N+1 (0≤N<∞) represents the dimensionality of the feature amount, and the ^ symbol denotes a vector.

When employed, the extraction section 27 calculates distances between extracted feature amounts extracted from two respective images, and determines that the reference image and the candidate image are similar images when the value of the calculated distance is a predetermined threshold value (similarity determination threshold value S1) or lower. In the extraction section 27 according to the present exemplary embodiment, for example, the Euclid distance, as expressed by L2 distance indicated in Equation (1), is employed as a distance of feature amounts representing image similarity.

$$dL_2(\hat{a}, \hat{b}) = \sqrt{\sum_{i=0}^{N}(a_i - b_i)^2} \quad (1)$$

Herein, $dL_2(\hat{a}, \hat{b})$ denotes an L2 distance between the feature amount a and the feature amount b. Accordingly, the similarity between the reference image and the candidate image increases as the value of $dL_2(\hat{a}, \hat{b})$ decreases.

The determination of similarity between images is not limited to methods employing the L2 distance. For example, the similarity between the reference image and the candidate image may be determined by mapping feature amounts extracted from each image at feature points, which are at locations to which feature extraction was applied, to vector space, and then comparing the vector distribution of the feature points of each image using statistical methods, machine learning, or the like.

Any indicator capable of quantitatively indicating the extent of similarity between images, such as the distance $L_p$ indicated in Equation (2), may be employed in the determination of extent of similarity between images.

$$dL_p(\hat{a}, \hat{b}) = \left(\sum_{i=0}^{N}|a_i - b_i|^p\right)^{\frac{1}{p}} \quad (2)$$

Herein, $dL_p(\hat{a}, \hat{b})$ denotes a distance $L_p$ between the feature amount a and the feature amount b.

When the calculated L2 distance is the similarity determination threshold value S1 or below, namely, when the reference image and the candidate image are similar, the extraction section 27 then selects from the registered images a frame image not yet selected as a candidate image as a new candidate image. Then, the above described determination of the extent of similarity is repeated between the reference images and the new candidate image.

However, when the calculated L2 distance is greater than the similarity determination threshold value S1, namely, when the reference image and the candidate image are dissimilar, the extraction section 27 sets the candidate image as a new reference image. A frame image not yet selected from the registered images as a candidate image is then selected as a new candidate image, and the above described determination of the extent of similarity between the new reference image and the new candidate image is repeated.

The extraction section 27 thereby extracts from the registered images any reference images with image feature amounts that differ from each other by more than the similarity determination threshold value S1.

The provision section 22 stores at least one reference image extracted by the extraction section 27 in the database 24 as a determination-use image to be employed in the determination as to whether or not the product A is included in the captured image posted to the SNS server 40 by the user, and provides the at least one determination-use image to the determination section 23, described below.

The at least one or more determination-use image corresponding to the product A and provided by the provision section 22 is stored in the database 24. The database 24 employs a document database, typically MongoDB for example. MongoDB is a document database that includes plural documents in respective collections, and can define freely selected fields for each document according to the structure and data format of the determination-use image. MongoDB is a database applied for management of so-called big data, in which database distribution as the amount of stored determination-use images increases is relatively simple compared to in a conventional relational database (RDB).

FIG. 5 and FIG. 6 are diagrams illustrating an example of a database structure for different determination-use images in each diagram. Note that any text following "//" in FIG. 5 and FIG. 6 is a comment explaining the content of the corresponding field.

The database 24 according to the present exemplary embodiment includes, for example, a primary key, a time of storage, photographer information, information regarding the imaged object, information regarding the feature extraction algorithm employed, the feature amount in the image, the determination algorithm of the reference image, information regarding effects applied to the image, image storage location, and the like.

In the database structure illustrated in FIG. 5 and FIG. 6, the differences between FIG. 5 and FIG. 6 are the field portions surrounded by dashed lines in FIG. 6. In this case, the primary key, the time of storage, the feature amount of the image, and the storage location are different in the database.

Although the database 24 according to the present exemplary embodiment employs MongoDB in order to store determination-use images, the employed database is not limited thereto, and other types of databases may be employed. Moreover, a known file system such as the NT File System (NTFS) may be employed without employing a database.

The reception section 25 receives captured images posted to the SNS server 40 during the campaign period for the product A.

The determination section 23 receives captured images from the reception section 25 and extracts feature amounts from the captured images using the same feature extraction algorithm as the extraction section 27. The determination section 23 then, for example, calculates an L2 distance indicating the extent of similarity of the image from the feature amounts of the captured image and the feature amounts of each of the determination-use images of the product A stored in the database 24 using Equation (1). The determination section 23 then determines whether or not the product A is included in the captured image by comparing the calculated L2 distance and the similarity determination threshold value S1.

According to the determination result made by the determination section 23, the output section 26 outputs an email or the like containing information related to the campaign for the product A, such as a URL link to an application form for a gift, to the user terminal 30 of the user who posted the captured image including the product A for example. In such an event, the output section 26 may output information specifying the determination result made by the determination section 23 and the provision origin of the captured image, to the service request terminal 50 of the drinks manufacturer implementing the campaign for the product A. The reception section 25 may acquire the captured image managed by the SNS server 40, and information such as an email address specifying the provider of the captured image, using application programming interfaces (API) pre-prepared for each SNS service.

Figure 7:
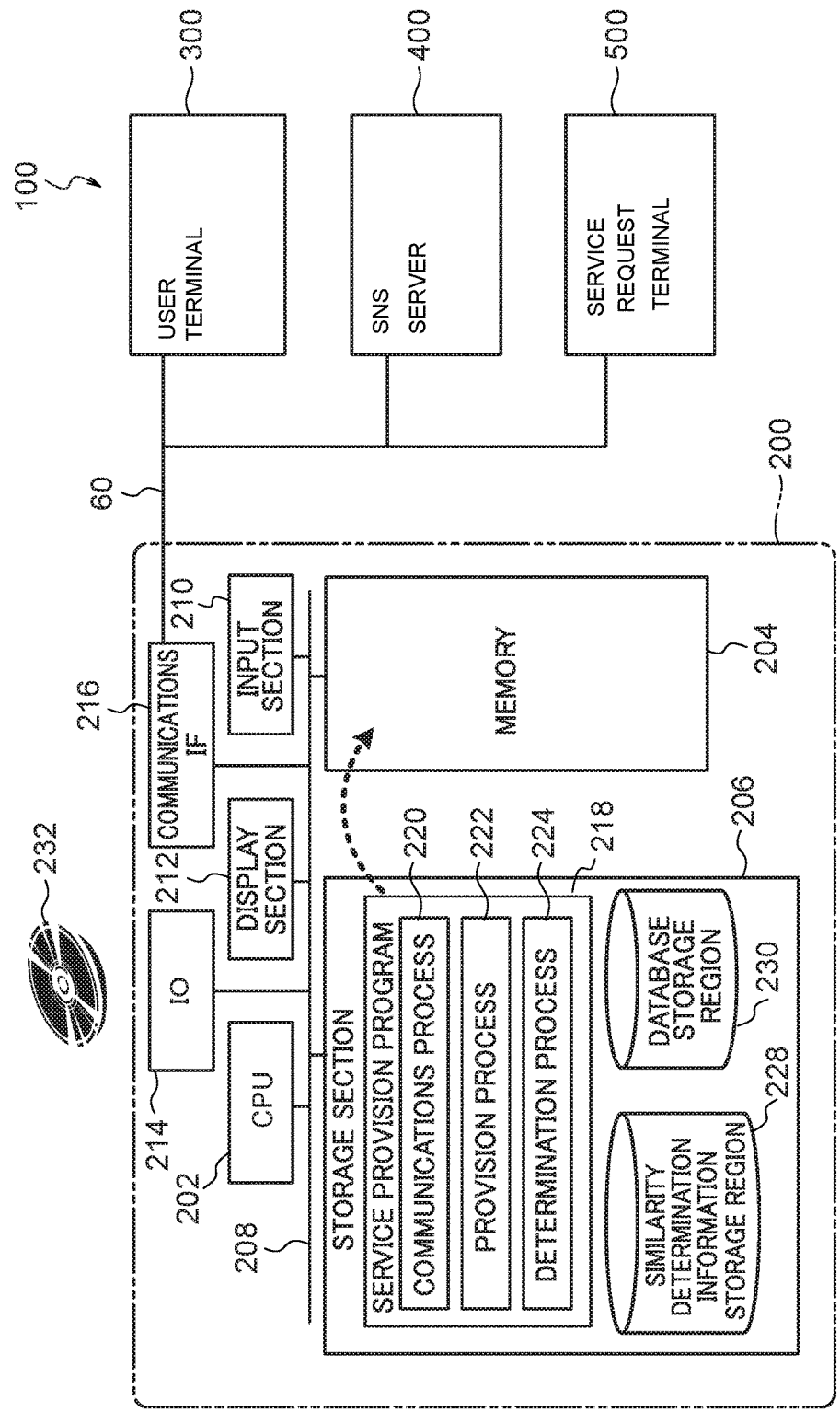
FIG. 7 is a diagram illustrating an example of a service provision device implemented by a computer.

FIG. 7 illustrates a computer system 100 as a computer implementable example of the service provision device 20, the user terminal 30, the SNS server 40, and the service request terminal 50 included in the service provision system 10.

The computer system 100 illustrated in FIG. 7 as the service provision system 10 includes a computer 200 as the service provision device 20. The computer system 100 also includes a computer 300 as the user terminal 30, a computer 400 as the SNS server 40, and a computer 500 as the service request terminal 50.

The computer 200 includes a CPU 202, memory 204, and a nonvolatile storage section 206. The CPU 202, the memory 204, and the nonvolatile storage section 206 are connected to one another through a bus 208. The computer 200 includes an input section 210 such as a keyboard and mouse, and a display section 212 such as a display. The input section 210 and the display section 212 are connected to the bus 208. An IO 214 for reading/writing from/to a recording medium 232 is also connected to the bus 208 in the computer 200. The computer 200 also includes a communications interface (IF) as an interface for connecting to the communication line 60, and the communications IF 216 is also connected to the bus 208. The storage section 206 may be implemented by a hard disk drive (HDD), flash memory, or the like.

A service provision program 218 that causes the computer 200 to function as the service provision device 20 illustrated in FIG. 3, a similarity determination information storage region 228, and a database storage region 230 are stored in the storage section 206. The service provision program 218 stored in the storage section 206 includes a communications process 220, a provision process 222, and a determination process 224.

The CPU 202 reads the service provision program 218 from the storage section 206, expands the service provision program 218 into the memory 204, and executes each process included in the service provision program 218. The CPU 202 expands similarity determination information included in the similarity determination information storage region 228 into the memory 204 as the similarity determination threshold value S1. The CPU 202 expands information for configuring a database included in the database storage region 230 into the memory 204, and configures the database 24.

The computer 200 operates as the service provision device 20 illustrated in FIG. 3 by the CPU 202 reading the service provision program 218 from the storage section 206, expanding the service provision program 218 into the memory 204, and executing the service provision program 218. The computer 200 operates as the communications section 21 including the reception section 25 and the output section 26 illustrated in FIG. 3 by the CPU 202 executing the communications process 220. The computer 200 operates as the provision section 22 included in the extraction section 27 illustrated in FIG. 3 by the CPU 202 executing the provision process 222. The computer 200 operates as the determination section 23 illustrated in FIG. 3 by the CPU 202 executing the determination process 224.

Note that the service provision device 20 may also be implemented by, for example, a semiconductor integrated circuit, and more specifically by an application specific integrated circuit (ASIC), or the like.

Next, explanation follows regarding operation of the service provision device 20 according to the present exemplary embodiment. When determination-use images of the product A are not stored in the database 24, the service provision device 20 according to the present exemplary embodiment executes determination-use image generation processing.

Figure 8:
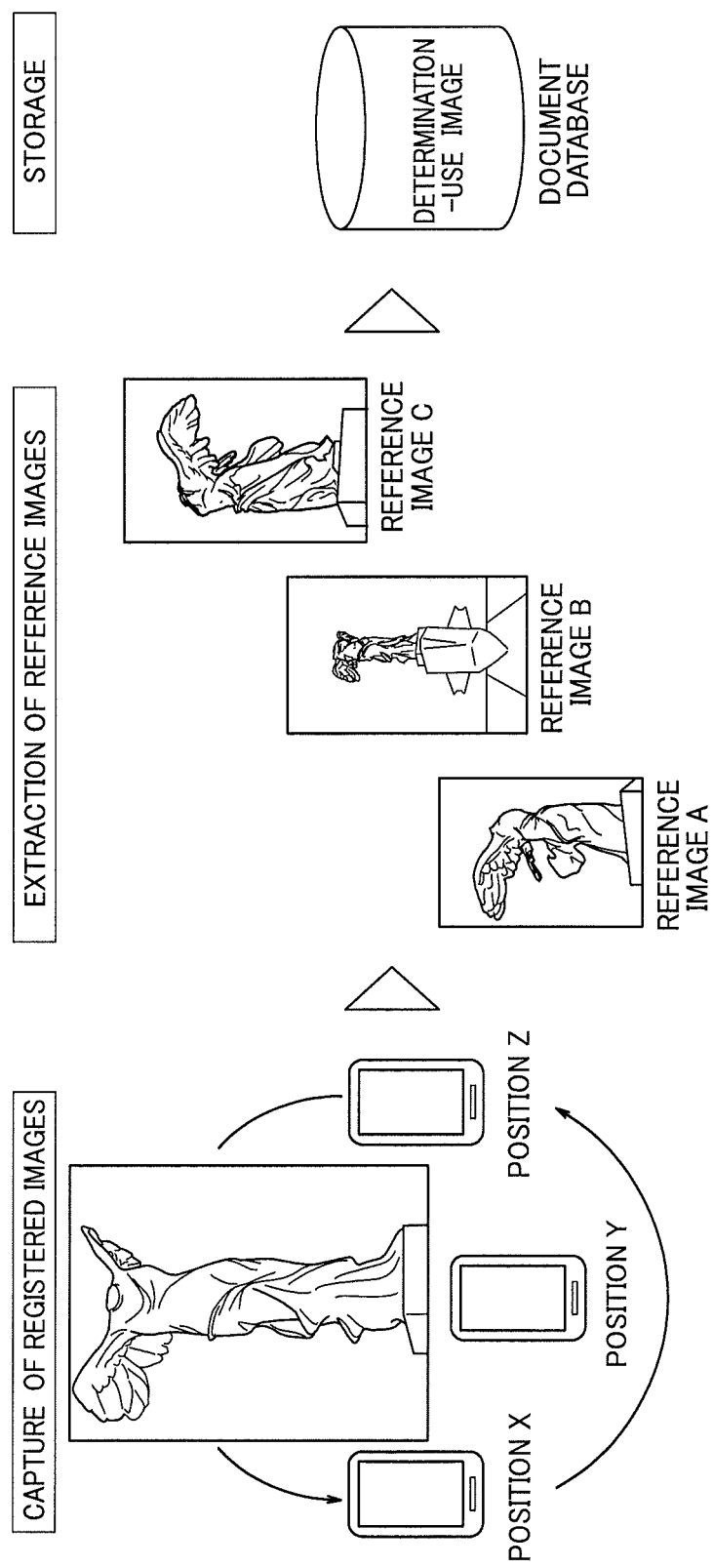
FIG. 8 is a diagram illustrating a flow of determination-use image generation processing.

FIG. 8 is a diagram schematically illustrating an example of a flow of determination-use image generation processing. For example, as illustrated in FIG. 8, the reception section 25 receives registered images that were captured while a representative of the manufacturer moved around a product from a position X→a position Y→a position Z→the position X in this order, by at least 360° or more. The extraction section 27 then extracts at least one or more images out of the registered images that are dissimilar to one another; these are references image A to reference image C in the example of FIG. 8. The provision section 22 then stores the reference images extracted from the extraction section 27 in the database 24 as determination-use images.

Figure 9:
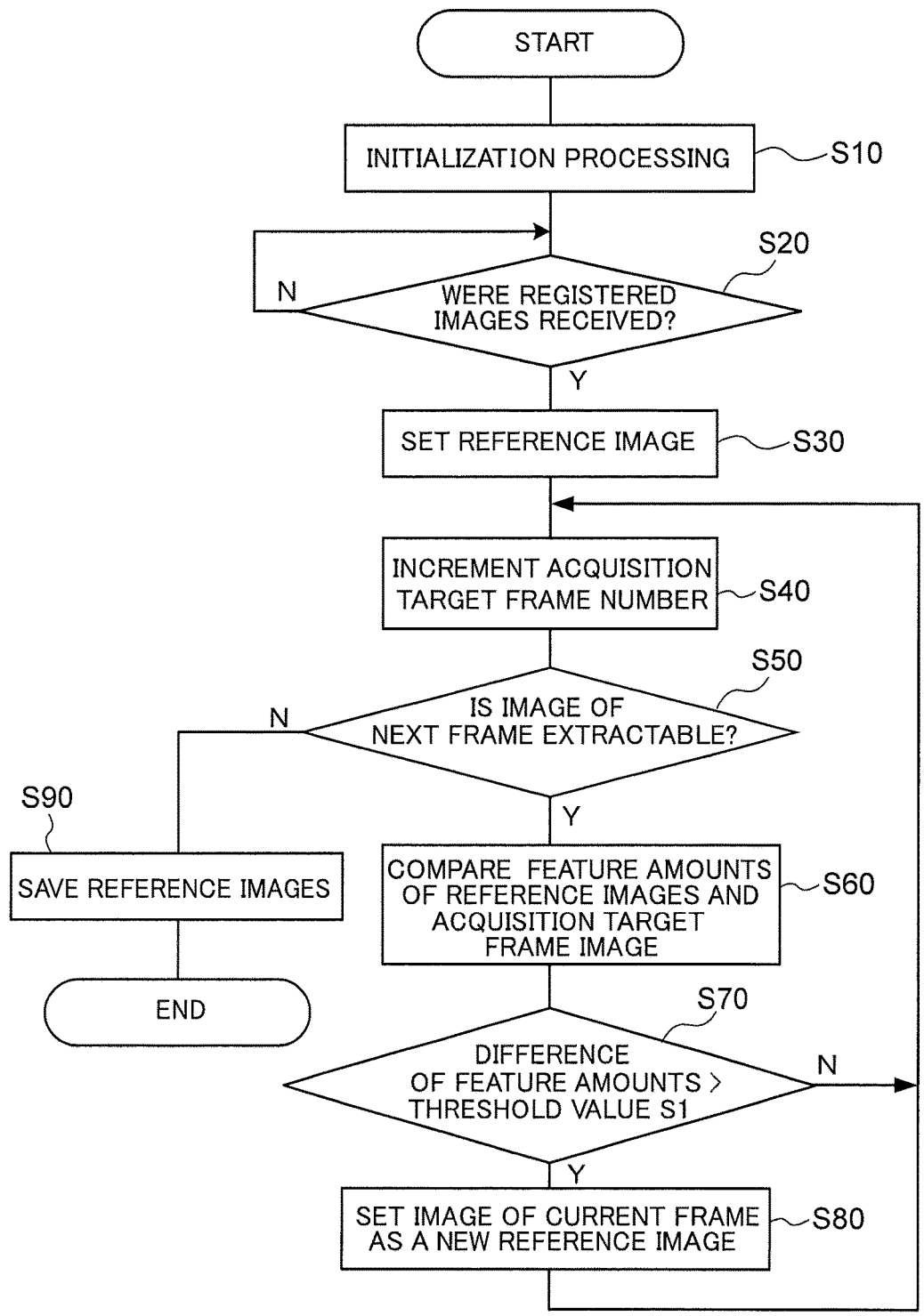
FIG. 9 is flowchart illustrating an example of a flow of determination-use image generation processing of a service provision system according to a first exemplary embodiment.

FIG. 9 is a flowchart illustrating an example of a flow of the determination-use image generation processing schematically explained in FIG. 8.

First, at step S10, initialization processing needed for execution of the determination-use image generation processing is executed. Specifically, the extraction section 27 acquires the similarity determination threshold value S1 expanded in to the memory 204.

At step S20, the reception section 25 determines whether or not the registered images of the product A were received from service request terminal 50. In cases of negative determination, the processing of step S20 is repeated until the registered images are received. In cases of affirmative determination, the received registered images are stored in a predetermined region in the memory 204, and processing transitions to step S30.

At step S30, the extraction section 27 extracts the first frame included in the registered images received by the processing of step S20, namely, the captured image corresponding to FRAME 1, and sets the extracted frame as a reference image. At this time the extraction section 27 stores the frame number of the captured image extracted from the registered images in a predetermined region in the memory 204.

At step S40, the extraction section 27 updates the frame number of the captured image next to be extracted from the registered images to the value given by adding 1 to the frame number stored in the memory 204.

At step S50, the extraction section 27 extracts the captured image of the frame number updated in the processing of step S40 from the registered images, and determines whether or not extraction of the captured image succeeded. Processing then transitions to step S60 in cases of affirmative determination. Note that image extraction fails when an attempt is made to extract from the registered images a captured image of a frame number exceeding the final frame number included in the registered images.

At step S60, the extraction section 27 uses the BRISK method to extract the captured images extracted from the registered images in the processing of step S50, namely, the extraction section 27 extracts from each of the images the feature amounts $\hat{a}$ of the candidate images, and the feature amounts $\hat{b}$ of the currently set reference images. As mentioned above, the feature extraction algorithm employed by the extraction section 27 is not limited to the BRISK method, and known feature extraction algorithms may be employed.

Then, according to Equation (1), the extraction section 27 calculates the L2 distance $dL_2$ ($\hat{a}$, $\hat{b}$) indicating the extent of similarity of the images from the feature amounts $\hat{a}$ of the candidate images and the feature amounts $\hat{b}$ of the reference images. As mentioned above, the indicator of the extent of similarity between images employed by the extraction section 27 is not limited to the L2 distance, and another indicator capable of quantitatively indicating the extent of similarity between images may be employed.

Effect processing on images, such as background elimination, may executed on the candidate images and the reference images before extracting the feature amounts from the candidate images and the reference images. In such cases the feature amounts of the image of the product A can be extracted with high precision since the background behind the product A is eliminated from each of the images.

At step S70, the extraction section 27 determines whether or not the L2 distance $dL_2$ ($\hat{a}$, $\hat{b}$) calculated at step S60 is greater than the similarity determination threshold value S1 acquired in the processing of step S10, namely, the extraction section 27 determines whether or not the candidate image and the reference image are similar to each other. When the reference image and the candidate image are determined to be similar to each other, this means that, in other words, it is possible to determine that a reference image and the candidate image captured from a different angle are similar images to each other using an existing reference image. Accordingly, in cases of negative determination, namely, cases of the reference image and the candidate image being similar to each other, processing transitions to step S40 without the candidate image subject to determination being set as a reference image.

Processing transitions to step S80 when affirmative determination is made by the determination processing of step S70. When the candidate image and the reference image are determined as not being similar to each other, this means that, in other words, it is not possible to extract the features of the product A from the candidate image using the existing reference images even though the candidate image depicts the same product A. This is because the reference images and the candidate image were captured under different image capture conditions, such as different imaging angles, and the feature amounts extracted from the images therefore differ by more than the similarity determination threshold value S1 even though they are images of the same product A.

Thus at step S80, instead of just the existing reference images, the extraction section 27 sets the candidate image determined as not being similar to the existing reference images as a new reference image, and processing transitions to step S40. The processing of step S40 to step S80 is then repeated, and any reference images of the product A are acquired having differences in the feature amounts of the captured image differing from captured images of the product A captured in various directions along the periphery of the product A by more than the similarity determination threshold value S1.

When negative determination is made by the determination processing of step S50, namely, when all of the reference images have between extracted from the registered images, processing transitions to step S90.

At step S90, the provision section 22 stores as determination-use images all of the reference images set by the extraction section 27 in the processing of step S30 and step S80, in a predetermined region in the memory 204. Since the image of FRAME 1 is set as a reference image in the processing of step S30, at least one or more determination-use image exists.

The determination-use image generation processing thus ends.

Determination is made as to whether or not extraction of all of the reference images from the registered images is complete according to whether or not the extraction of captured images succeeded in the processing of step S50. However, this determination may be made by other methods. For example, the final frame number for the captured images included in the pre-registered images may be acquired, and determination may be made as to whether or not the frame number updated by the processing of step S40 is the final frame number or less.

In the determination-use image generation processing illustrated in FIG. 9, at the processing of step S80 the reference images for comparison with the candidate image are successively updated when the difference that is the distance between the feature amounts of the candidate image and feature amounts of the reference image are greater than the similarity determination threshold value S1. However, the determination-use images may be generated by each time comparing against the reference images set by the processing of step S30, without updating the reference images being compared to the candidate images.

In such cases, in the processing of step S80, the extraction section 27, for example, stores candidate images determined to not be similar to the existing reference images in the memory 204, and changes the value of the similarity determination threshold value S1 employed in the determination processing of step S70 each time the processing of step S80 is executed. For example, if the value of similarity determination threshold value S1 is provisionally set as K for generating determination-use images with image feature amounts that different from one another by more than similarity determination threshold value S1, each time the processing of step S80 is executed, the value of the similarity determination threshold value S1 may be changed in the sequence K, (K×2), (K×3), and so on.

The provision section 22 may then, in the processing of step S90, set the reference images set by the processing of step S30 and the candidate images saved in the memory 204 by the processing of step S80 as determination-use images.

Figure 10:
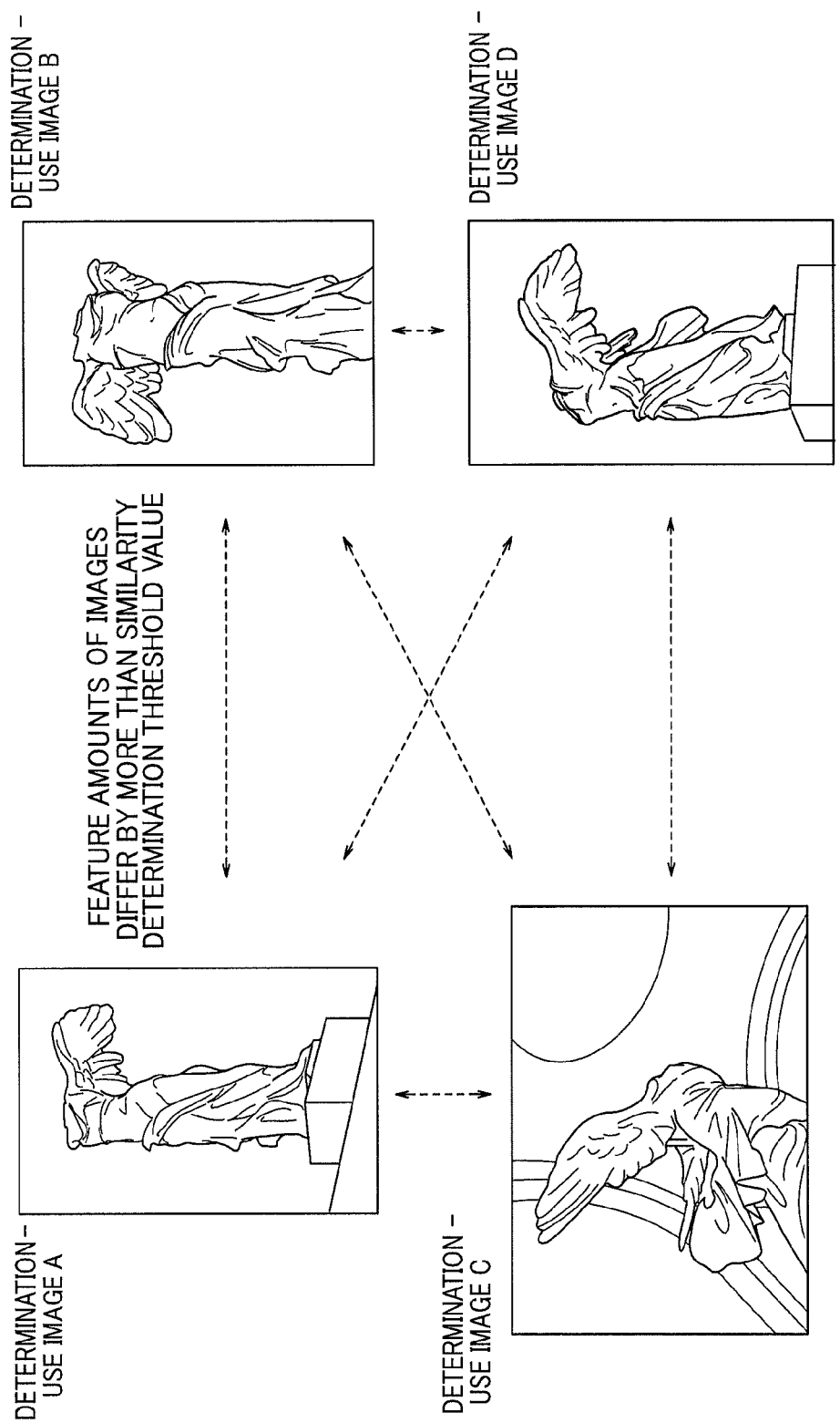
FIG. 10 is a diagram illustrating an example of an execution result of determination-use image generation processing of a service provision system according to the first exemplary embodiment.

FIG. 10 is a diagram illustrating an example of a determination-use image extracted from the registered images as a result of the determination-use image generation processing illustrated in FIG. 9. In the example of FIG. 10, four images, determination-use image A to determination-use image D, are extracted from the registered images. The determination-use image A to determination-use image D extracted by the determination-use image generation processing are images having image feature amounts that differ from one another by more than the similarity determination threshold value S1.

Figure 11:
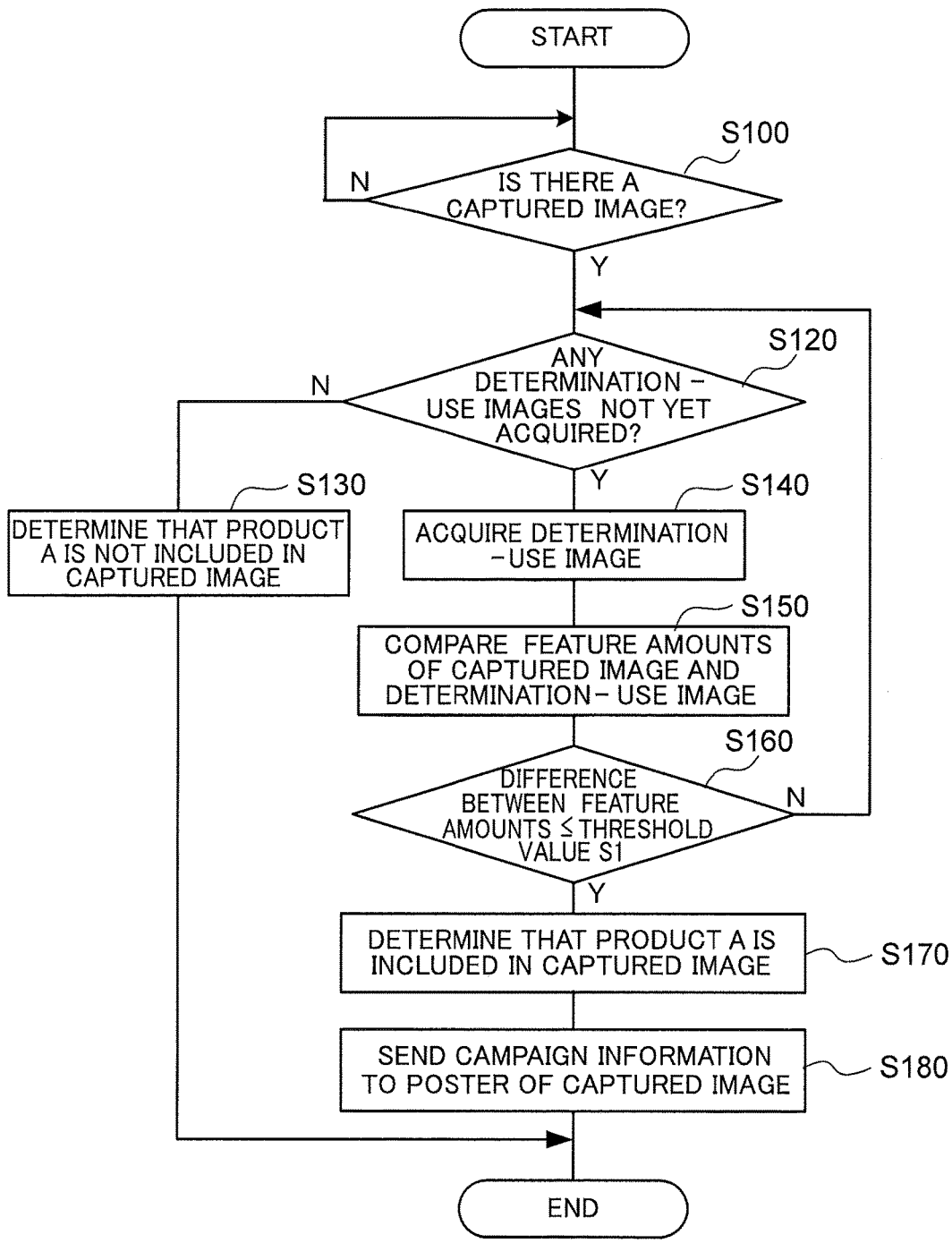
FIG. 11 is a flowchart illustrating an example of a flow of determination processing of a service provision system according to the first exemplary embodiment.

FIG. 11 is a flowchart illustrating an example of a flow of determination processing executed by the service provision device 20 during the campaign period for the product A after the determination-use image generation processing illustrated in FIG. 9 ends.

First, at step S100, the reception section 25 references the SNS server 40 and determines whether or not there are captured images posted to the SNS server 40 by a user. The processing of step S100 is repeated and the SNS server 40 is continuously referenced in cases of negative determination. In cases of affirmative determination, the captured images are acquired from the SNS server 40 and stored in a predetermined region in the memory 204, and processing transitions to step S120. When doing so, the reception section 25 uses an API, provided by the administrator or the like managing the SNS server 40, to acquire identification information uniquely indicating the user who posted the acquired captured image, for example an email address, and stores the identification information in the memory 204 in association with the captured image.

At step S120, the determination section 23 determines whether or not there are any determination-use images not yet acquired from the determination-use images of the product A stored in the database 24, and processing transitions to step S140 when affirmative determination is made.

At step S140, the determination section 23 acquires determination-use images not yet acquired from the database 24 along with feature amounts of the determination-use images.

Then, at step S150, the determination section 23 performs image matching by scanning the captured images acquired by the processing of step S100 while resizing the determination-use images acquired by the processing of step S140. The determination section 23 then uses the same feature extraction algorithm as the feature extraction algorithm used by the extraction section 27 to calculate the feature amounts of the regions of the captured images determined to be most similar to the determination-use images.

The determination section 23 then calculates, for example according to Equation (1), the L2 distance indicating the extent of mutual image similarity from the feature amounts of the captured image extracted in the current step and from the feature amounts of the determination-use images acquired by the processing of step S140. Although the L2 distances between the captured images and the determination-use images are calculated here, an indicator of the extent of image similarity may be calculated other than the L2 distance.

At step S160, the determination section 23 acquires the similarity determination threshold value S1 expanded in the memory 204, and determines whether or not the L2 distance calculated at step S150 is the similarity determination threshold value S1 or less. In cases of affirmative determination, namely, cases in which determination is made that there are no regions in the captured image similar to the determination-use images of the product A, processing transitions to step S120, the processing of step S120 to step S160 is repeated, and determination is made as to whether there is a region in the captured image similar to the determination-use image of the product A. Processing transitions to step S170 when the determination result of the current step is an affirmative determination, namely, when determination is made that there is a region in the captured image similar to a determination-use image for the product A.

At step S170, the determination section 23 determines that the product A is included in the captured image since a portion of the captured image and a determination-use image for the product A are similar to each other.

Then, at step S180, the determination section 23 requests that the output section 26 output an email containing information relating to the campaign for the product A such as a URL link to an application form for a gift to the user who uploaded the captured image. The output section 26 generates the email based on the request from the determination section 23 and outputs the generated email to the email address that was acquired by the processing of step S100 of the user who posted the captured image, and the determination processing illustrated in FIG. 11 ends.

When negative determination is made in the determination processing of step S120, namely, when determination is made that there are no regions in the captured image similar to any of the determination-use images for the product A, processing transitions to step S130. Then, at step S130, the determination section 23 determines that the product A is not included in the captured image, and the determination processing illustrated in FIG. 11 ends.

The determination processing illustrated in FIG. 11 is repeatedly executed during the campaign period for the product A.

As a result of the determination processing, the user of the user terminal 30 that received the email from the service provision device 20 may, for example, obtain a reward such as a gift from the drinks manufacturer by accessing the URL in the email and inputting the mandatory information into the application form.

Although an email is sent to the user who posted the captured image each time determination is made that the product A is included in a captured image in the determination processing illustrated in FIG. 11, the timing at which the email is sent is not limited thereto. For example, the email may be saved in the memory 204, and the email may be sent to the user who posted the captured image after the campaign period for the product A ends.

In this manner, the service provision device 20 may employ images with feature amounts that differ from one another by more than the similarity determination threshold value S1 as determination-use images when determining whether or not the product A is included in the captured image. Accordingly, the product A may be extracted with high precision from the captured images under different image capture conditions using a smaller number of determination-use images.

Explanation has been given above in which the registered images received from the service request terminal 50 are images captured while moving around the product A by at least 360° or more; however, the registered images may be images capturing the product A from various different angles. In such cases, determination-use images may be generated in order to extract the product A included in captured images with higher precision.

Only pre-captured images of the product A for which image capture has completed are employed as registered images in the service provision device 20 according to the present exemplary embodiment; however, the registered images are not limited to such images. For example, the registered images may be real-time images captured while rotating once around the product A, sent from a terminal (an image capture terminal) installed with a dedicated application provided by the administrator who manages the service provision device 20. The service request terminal 50 may be employed as the image capture terminal.

In such cases, the reception section 25 receives instructions from the image capture terminal indicating image capture start or image capture end, and starts acquiring registered images on instruction to start image capture. Then, at step S40 in FIG. 9, the extraction section 27 acquires images one frame at a time, and in the processing of step S50, the extraction section 27 determines whether or not instruction to end image capture has been received from the image capture terminal, and processing transitions to step S90 and the determination-use image generation processing is ended if instruction to end image capture has been received.

Moreover, when a photographer of images of the product A moves around the product A, determination-use image generation processing may be ended at the timing when the photographer returns to the image capture start location, without receiving an instruction to end image capture from the image capture terminal. In such cases, it may, for example, be determined that imaging has returned to the image capture start location when the feature amounts of the image received from the image capture terminal in the processing of step 40 is compared to the feature amounts of each of the reference images set in the processing of step 30, and differs from by a predetermined value or less.

Second Exemplary Embodiment

Next, explanation follows regarding a second exemplary embodiment. The service provision system according to the second exemplary embodiment is similar to the service provision system according to the first exemplary embodiment illustrated in FIG. 3. The service provision system according to the second exemplary embodiment may therefore be implemented by a computer system similar to the computer system 100 according to the first exemplary embodiment illustrated in FIG. 7. However, the service provision device 20 in FIG. 3 is replaced with a service provision device 20A, the extraction section 27 is replaced with an extraction section 27A, and the determination section 23 is replaced with a determination section 23A. Moreover, in FIG. 7, the computer 200 is replaced with a computer 200A, the provision process 222 is replaced with a provision process 222A, the determination process 224 is replaced with a determination process 224A, and the service provision program 218 is replaced with a service provision program 218A.

Herein, the same reference numerals are allocated to portions corresponding to those of the first exemplary embodiment, and explanation focuses on the portions that differ from the first exemplary embodiment.

In the extraction section 27 according to the first exemplary embodiment, a known feature extraction algorithm is employed to extract feature amounts from each of the reference images and the candidate image, and determination is made as to whether or not the candidate image is to be set as a new reference image, based on distances between the feature amounts.

In the extraction section 27A according to the present exemplary embodiment, the reference images are set by categorizing the candidate images using a clustering algorithm. Clustering is a type of image processing that categorizes images using a quality indicative of the existence of similar images clustering together spatially in feature space.

The clustering algorithm employed by the extraction section 27A is not limited, and for example, a known clustering algorithm such as a nearest neighbor method may be employed.

In a nearest neighbor method, an arbitrary number of classes are pre-generated, and each class is allocated a typical vector value, such as a feature amount, representing the class. Each candidate image is then categorized into a class having the typical vector value the smallest distance away from the vector value, such as the feature amount, obtained from the candidate image, and wherein this distance is the similarity determination threshold value S1 or lower. When the distance from feature amount of the candidate image to the typical vector of the closest class is greater than similarity determination threshold value S1, the feature amount of the candidate image is set as a typical vector value, and a new class is generated. Images are then selected one at a time from each class and set as registered images.

The determination section 23A according to the second exemplary embodiment also uses the same clustering algorithm as the extraction section 27A to categorize the captured image into a class of determination-use images having feature amounts that are typical vector values. When doing so, the determination section 23A determines that the product A is included in the captured image when it is able to categorize the captured image into a class, and determines that the product A is not included in the captured image when unable to categorize the product A into any class.

Next, explanation follows regarding operation of the service provision device 20A according to the present exemplary embodiment. The service provision device 20A according to the present exemplary embodiment executes the determination-use image generation processing when determination-use images for the product A are not stored in the database 24.

Figure 12:
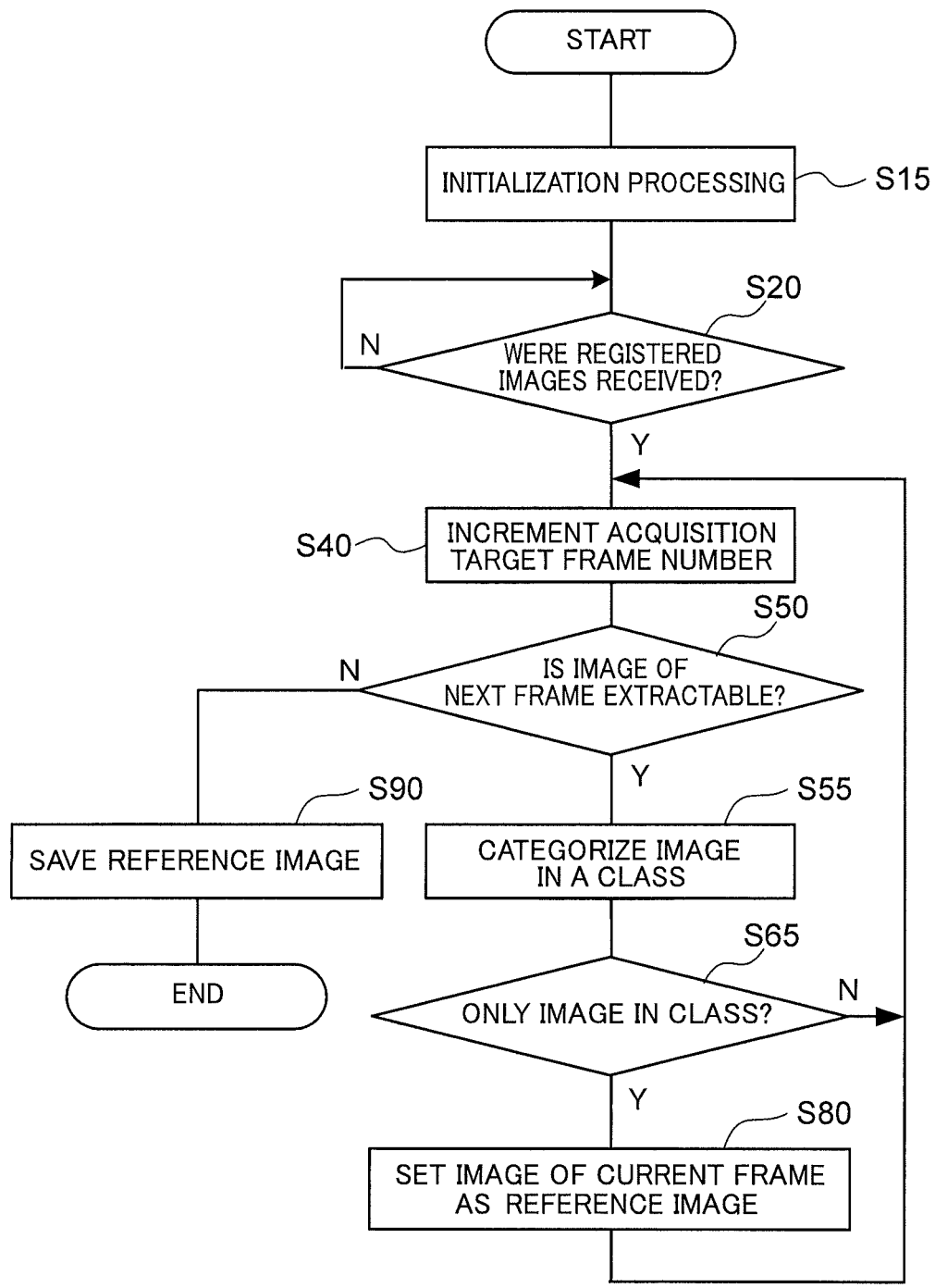
FIG. 12 is a flowchart illustrating an example of a flow of determination-use image generation processing of a service provision system according to a second exemplary embodiment.

FIG. 12 is a flowchart illustrating an example of a flow of determination-use image generation processing according to the present exemplary embodiment. The flowchart illustrated in FIG. 12 differs from the flowchart of the determination-use image generation processing according to the first exemplary embodiment illustrated in FIG. 9 in that initialization processing of step S10 is substituted by the initialization processing of step S15, and that the processing of step S30 is omitted. Moreover, the processing of step S60 is substituted by the processing of step S55, and the processing of step S70 is substituted by the processing of step S65.

First, at step S15, the extraction section 27A acquires the similarity determination threshold value S1 that was expanded into the memory 204, and acquires the typical vector values of plural arbitrary classes that were expanded into the memory 204 in advance. Typical vector information for each of the classes is stored in the storage section 206, and prior to starting the determination-use image generation processing, the CPU 202 expands the typical vector information of each of the classes into the memory 204 as the typical vector values. The typical vector values of each of the classes differ greatly from one another by, for example, three times the similarity determination threshold value S1.

Then, at step S55, the extraction section 27A extracts the feature amounts of a candidate image, and categorizes the candidate image using, for example, a known clustering algorithm such as the nearest neighbor method described above.

As explained specially above, each candidate image is then categorized into a class such that the feature amount of the candidate image and the typical vector value acquired in the processing of step S15 are the smallest distance away, and wherein this distance is less than the similarity determination threshold value S1. When the distance between the feature amount of the candidate image and the typical vector of the closest class is greater than similarity determination threshold value S1, the feature amount of the candidate image is set as a typical vector value, and a new class is generated.

Effect processing on images, such as background elimination, may be executed on the candidate images before extracting the feature amounts from the candidate image. In such cases, the feature amounts of the image of the product A can be extracted from the candidate image with high precision since the background behind the product A is eliminated.

At step S65, the extraction section 27A determines whether or not the candidate image categorized into a class by the processing of step S55 is the only candidate image in the categorization destination class. When affirmative determination is made, processing then transitions to step S80, and the only image in that categorization destination class is set as a reference image.

When negative determination is made, processing transitions to step S40, and processing to categorize the candidate image of the updated frame number into one of the classes is repeated.

In this manner, images of the registered images with image differences bigger than the similarity determination threshold value S1 can be extracted as determination-use images also in cases in which the extraction section 27A uses the clustering algorithm.

FIG. 13 is a diagram illustrating an example of determination-use images extracted from the registered images as a result of the determination-use image generation processing illustrated in FIG. 12. In the example of FIG. 13, one determination-use image is extracted from the registered images for each of four classes, class A to class D. The determination-use images for each class extracted by the determination-use image generation processing are images with mutual image differences greater than the similarity determination threshold value S1.

Figure 14:
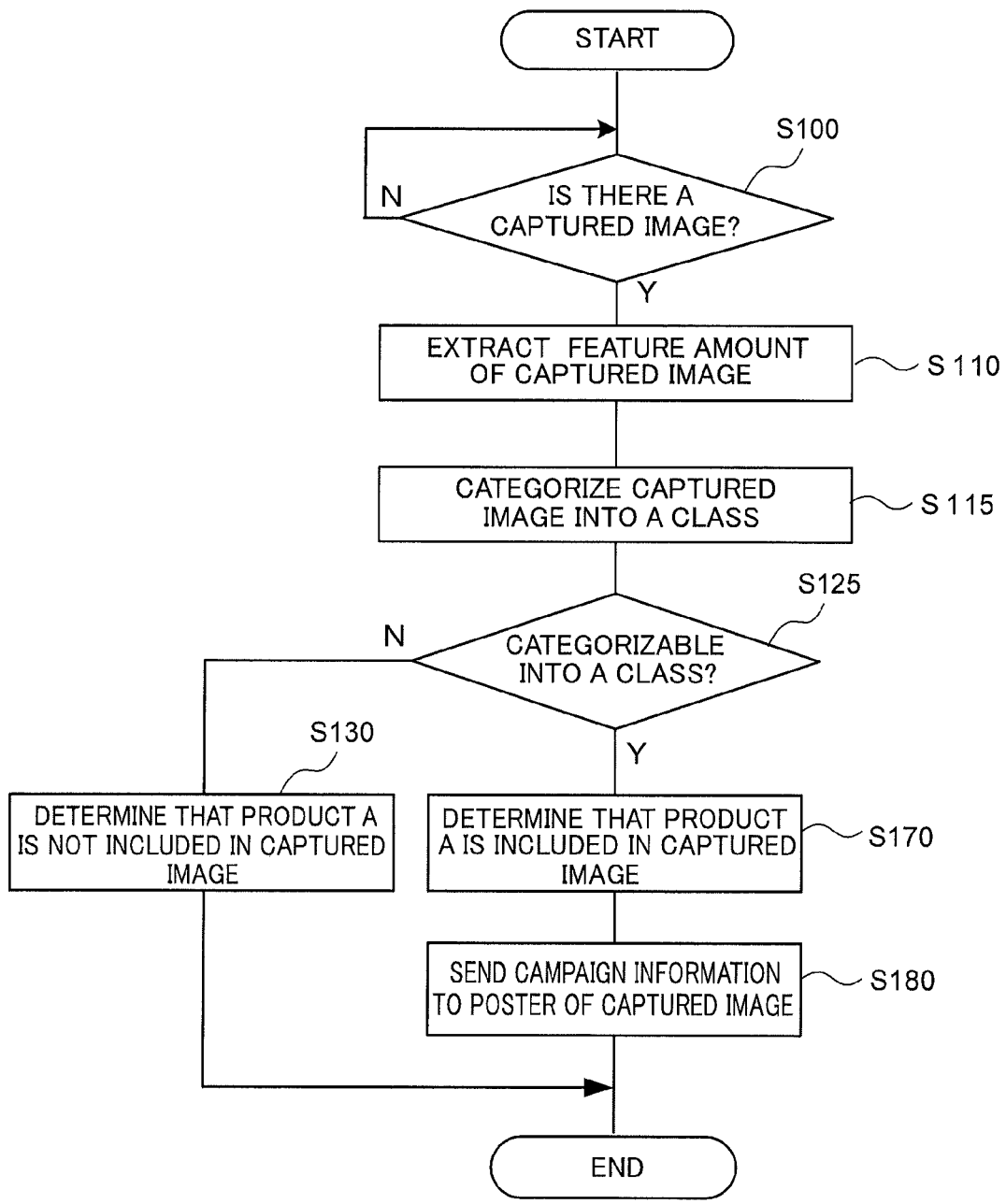
FIG. 14 is a flowchart illustrating an example of a flow of determination processing of a service provision system according to the second exemplary embodiment.

FIG. 14 is a flowchart illustrating an example of a flow of determination processing executed during the campaign period for the product A by the service provision device 20A after the determination-use image generation processing illustrated in FIG. 12 has ended.

The flowchart illustrated in FIG. 14 differs from the flowchart of the determination processing according to the first exemplary embodiment illustrated in FIG. 11 in that the processing of step S110 has been added. Moreover, the processing of each of step S120, step S140, step S150, and step S160 of FIG. 11 has been substituted by processing of step S115 and step S125.

At step S110, the determination section 23A calculates the feature amounts of the captured image acquired by the processing of step S100 using the same feature extraction algorithm as was used by the extraction section 27A.

At step S115, the determination section 23A categorizes the captured image into the respective classes represented by the determination-use images, based on the feature amounts of the captured image acquired by the processing of step S110. When this is performed, the determination section 23A categorizes the captured images into the respective classes using, for example, the nearest neighbor method used by the extraction section 27A to extract the reference images from the registered images. The clustering algorithm employed by the determination section 23A is not limited to the nearest neighbor method, and known clustering algorithms may be employed.

At step S125, the determination section 23A determines whether or not it has been able to categorize the captured image into a class. Processing transitions to step S130 when negative determination is made, and processing transitions to step S170 when affirmative determination is made.

In this manner, the service provision device 20A is able to determine whether or not the product A is included in a captured image using images having mutual image differences greater than the similarity determination threshold value S1 as the determination-use images. The product A can thereby be extracted with high precision from captured images having different image capture conditions using a smaller number of determination-use images.

Similarly to the service provision device 20 according to the first exemplary embodiment, the service provision device 20A according to the present exemplary embodiment may also employ real-time images sent from an image capture terminal during image capture of the product A, instead of using pre-captured images of the product A for which image capture is already complete as the registered images.

Although explanation of technology disclosed herein has been given above using exemplary embodiments, technology disclosed herein is not limited to the scope of the exemplary embodiments above. Various modifications and improvements may be made to the exemplary embodiments above within a range not departing from the spirit of technology disclosed herein, and the technological scope of technology disclosed herein also encompasses modes in which such modifications and improvements have been made. For example, the processing sequence may be modified within a range not departing from the spirit of technology disclosed herein.

Although explanation has been given above in which the service provision programs 218, 218A are pre-stored (pre-installed) on the storage section 206, there is not limitation thereto. The service provision programs according to technology disclosed herein may also be provided in a format recorded on a computer readable recording medium. For example, the service provision programs according to technology disclosed herein may also be provided in a format recorded on a portable recording medium such as a CD-ROM, a DVD-ROM, or USB memory. The service provision programs according to technology disclosed herein may also be provided in a format recorded on, for example, semiconductor memory such as flash memory.

In the first exemplary embodiment and the second exemplary embodiment, explanation has been given regarding an example in which the service provision devices 20, 20A are applied to a sales promotion campaign for a product using the SNS, and determination is made as to whether or not the product that is the campaign subject is included in images posted to the SNS.

However, the areas of application of the service provision devices 20, 20A are not limited to this example.

For example, the service provision devices 20, 20A may be employed in a marketing service utilizing the images posted to the SNS.

To simplify the explanation below, explanation is given of an example situation in which the service provision device 20 employs a marketing service. However, the service provision device 20A may also be applied in a similar situation.

First, the service provision device 20 executes the determination-use image generation processing illustrated in FIG. 9, and generates a determination-use image for the product (product subject to analysis) that is the subject of the marketing service. Note that there may be plural products subject to analysis, and determination-use images are generated for each of the products subject to analysis in such cases.

The service provision device 20 then acquires the captured image posted to the SNS server 40, and determines whether or not the product subject to analysis is included in captured image by executing the determination processing illustrated in FIG. 11.

When the product subject to analysis is included into the captured image, information related to when the product subject to analysis was imaged is also acquired in addition to the captured image. The content of the related information acquired is not limited, and includes information acquirable from the captured image.

For example, the related information may include the number of products subject to analysis included in the captured image, the ratio of the area occupied by products subject to analysis with respect to the size of the captured image, the image capture environment indicating whether the image capture location was indoors or outdoors, the weather at the time of image capture, and the like. Moreover, the type of processing for treating the captured image may be acquired, such as sepia toning such that an image exhibits the impression of passage of time, or styling as an illustration. Moreover, information may be acquired that indicates the number of people depicted with the product subject to analysis, their estimated ages, and whether they are smiling or angry, and information related to fashion that indicates whether they are formally dressed or casually dressed.

The relation information may also include information related to the image matching executed by the processing of step S150 illustrated in FIG. 11. The information related to the image matching is, for example, information indicating which location of the captured image was resized and by what extent, and to which determination-use image it was determined to be similar.

Then, based on the acquired related information related to the product subject to analysis, the service provision device 20, for example, performs analysis of information indicating who tends to use the product subject to analysis, and when and where they tend to use it, with this information being valuable in sales promotion of the product subject to analysis and the like. The analysis results are then sent to the service request terminal 50 of the manufacturer that requested the marking service.

When this is performed, the service provision device 20 may send the related information to the service request terminal 50 along with the analysis results. Moreover, the related information acquired from the captured images may be sent to the service request terminal 50 alone, and analysis based on the related information may implemented in the service request terminal 50.

When the product subject to analysis is analyzed based on the related information, the service provision device 20 may analyze a combination of other information such as text posted to the SNS server 40 together with the captured image, and marking data related to the product subject to analysis provided by the manufacturer.

In this manner, the service provision device 20 is able to provide the manufacturer with information related to sales promotion of the product.

Explanation follows regarding an example situation in which the service provision devices 20, 20A are employed in an active support service employing the images posted to the SNS. The active support service includes, for example, a service that analyzes images that include the product, and forwards images that give a favorable reaction to many people, namely, images likely to prove popular, and thereby increases favorable feelings toward the manufacturer by users.

The active support service determines whether or not the product subject to active support (the product subject to support) is included in the captured image by a method similar to that of the marking service described above.

When the product subject to support is included in the captured image, analysis is made as to whether or not the captured image is likely to be a popular image. In this analysis, for example, analysis is performed using plural evaluation items such as the feelings of people depicted in the captured image, the presence of absence of animals, and the content of any modification processing performed on the captured image, and sets a score for each evaluation item. For example, captured images in which the depicted people are laughing are set with a higher score than those in which the people are angry. The scores for each evaluation item are then summed, and captured images with a predetermined score or greater are determined to be images likely to be popular.

Images likely to be popular depicting the product of the manufacturer that requested the active support service can be spread across the internet, enabling the service provision device 20 to provide the manufacture with a service for increasing the favorable feelings toward the manufacturer by users.

Explanation has been given in the exemplary embodiments of cases in which the service provision devices 20, 20A are implemented by single computers 200, 200A. However, the processes may be executed by different computers, and the service provision devices 20, 20A may be implemented by respective computers connected by the communication line 60, in a distributed processing configuration.

In such cases, the provision processes 222, 222A provide the determination-use images over the communication line 60 to the computers that execute the determination processes 224, 224A.

Although the captured images are acquired from the SNS server 40 in each exemplary embodiment, the acquisition source of the captured images is not limited to the SNS server 40, and may be a server where users of an unspecified large number of user terminals 30 connected to the communication line 60 publish captured images, such as a message board or home page.

Although each of the exemplary embodiments adopt modes in which the registered images are received from the manufacturer, a request may be received from the manufacturer, and the registered images may be captured by the service provider that manages the service provision devices 20, 20A.

The appearance of a subject included in captured images changes according to image capture conditions during image capture of the subject, such as the angle and distance, even though the captured images are of the same subject, and there is a possibility of mis-recognizing the subject as not being included in a captured image.

Thus, conventionally, a method is employed in which mis-recognition is prevented by varying the imaging angle and pre-preparing plural captured determination-use images, and comparing the feature amounts of each of the determination-use images with the feature amounts of the product A depicted in the captured image. However, it is unclear how many determination-use images to prepare, and from what angles they are to be captured for this purpose.

One aspect of technology disclosed herein exhibits an advantage effect of enabling an optimization to be achieved in data volume of determination-use images for determining that a subject is included in a captured image.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory recording medium storing a program that causes a computer to execute a process, the process comprising:
   extracting a plurality of reference images from a plurality of first captured images obtained by imaging a given object from a plurality of different angles,
      at least one extracted reference image, among the extracted reference images, has a feature amount that differs by more than a reference amount from feature amounts of other extracted reference image; and
   providing the extracted reference images as determination—use images employable to determine whether the given object is included in a second captured image.

2. A non-transitory recording medium storing a program that causes a computer to execute a process, the process comprising:
   from a plurality of first captured images obtained by imaging a given object from a plurality of different angles, extracting and storing, in a memory, a plurality of reference images, at least one extracted reference image, among the extracted reference images, has a feature amount that differs by more than a reference amount from feature amounts of other extracted reference image; and
   comparing a feature amount of a second captured image other than the first captured images against the feature amount of the extracted reference images stored in the memory; and
   determining whether the given object is included in the second captured image based on a comparison result of the comparing.

3. The non-transitory recording medium of claim 2, wherein the second captured image is acquired through the Internet.

4. The non-transitory recording medium of claim 2, wherein the process further comprises:
   identifying a provision source of the second captured image in which the given object has been determined to be included; and
   outputting a message to the identified provision source.

5. The non-transitory recording medium of claim 4, wherein the process further comprises:
   outputting information that identifies the provision source of the second captured image in which the given object has been determined to be included.

6. The non-transitory recording medium of claim 1, wherein the extracting further comprises:
   setting a first captured image, among the first captured images, as a reference image;
   extracting another first captured image, among the first captured images, as the at least one extracted reference image which has a feature amount that differs from a feature amount of the set reference image by more than the reference amount; and
   setting the at least one extracted reference image as a new reference image, and further extracting another first captured image, among the first captured images, as another extracted reference image which has a feature amount that differs from a feature amount of the set new reference image by more than the reference amount.

7. The non-transitory recording medium of claim 1, wherein the process further comprises:
   categorizing the first captured images into a plurality of classes such that typical vectors of the classes differ by more than the reference amount from each other; and
   extracting the first captured images from the classes.

8. The non-transitory recording medium of claim 1, wherein the first captured images are first captured images in which a background behind the given object has been eliminated.

9. A service provision method, comprising:
   by at least one processor,
      extracting a plurality of reference images from a plurality of first captured images obtained by imaging a given object from a plurality of different angles,
         at least one extracted reference image, among the extracted reference images, has a feature amount that differs by more than a reference amount from feature amounts of other extracted reference image; and
      providing the extracted reference images as determination—use images employable to determine whether the given object is included in a second captured image.

10. The service provision method of claim 9, wherein the extracting further comprises:
- setting a first captured image from among the first captured images as a reference image
- extracting another first captured image, among the first captured images, as the at least one extracted reference image which has a feature amount that differs from a feature amount of the set reference image by more than the reference amount; and
- setting the extracted at least one reference image as a new reference image, and further extracting another first captured image, among the first captured images, as another extracted reference image which has a feature amount that differs from a feature amount of the set new reference image by more than the reference amount.

11. The service provision method of claim 9, further comprising:
- by the at least one processor,
  - categorizing the first captured images into a plurality of classes such that typical vectors of the classes differ by more than the reference amount from each other; and
- extracting the first captured images from the classes.

12. The service provision method of claim 9, wherein the first captured images are captured images in which a background behind the given object has been eliminated.

* * * * *